Figure 1:
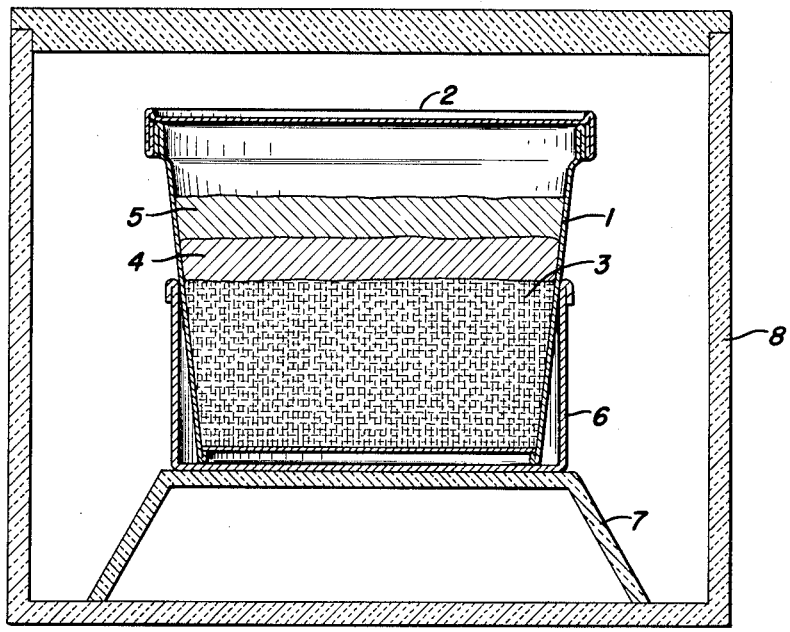
Figure 3:
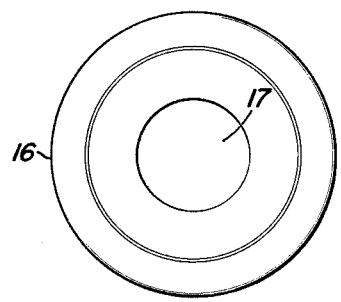

June 17, 1952   F. W. MOFFETT, JR   2,600,566
METHOD OF HEATING FROZEN FOOD PACKAGES
Filed Nov. 23, 1949

INVENTOR.
FRANK WESLEY MOFFETT JR.
BY Harold E. Stonebraker,
HIS ATTORNEY

Patented June 17, 1952

2,600,566

UNITED STATES PATENT OFFICE 2,600,566

METHOD OF HEATING FROZEN FOOD PACKAGES

Frank Wesley Moffett, Jr., Chili, N. Y.

Application November 23, 1949, Serial No. 128,947

4 Claims. (Cl. 99—221)

This invention relates to a frozen food package and method of heating the same preparatory to serving, and has for its object to afford a convenient, effective and practical method of controlling the heating of a food package by high frequency alternating currents such as created by electronic generators of the vacuum tube type, so as to heat different portions of a package to different degrees while in the same electronic field.

The invention is applicable to the heating of foods by what is sometimes known as electronic or diathermic heating where heat is created inside a non-conducting substance by the dielectric method through radio frequency generators, and has for one purpose to afford a method whereby such current waves can be controlled so as to effect a uniform heating, or softening, of all portions of a food package, or where the package comprises a multiplicity of different food products in juxta-relation to each other, or separated by individual containers, to control the current waves so as to heat one food product to a greater extent or independently of another food product in the same package, thus effecting the heating of several foods of a given package to different degrees through the instrumentality of an electrically conductive shield or shields positioned in relation to the food or food products so as to control the passage of current waves thereto and consequently the amount of heat set up in the particular food product.

A further purpose of the invention is to afford a simple, practical, and readily handled form of frozen food package or confection that lends itself easily to a heating process such as described above, and consisting of a body of ice cream or frozen dessert and a body of topping or syrup adapted to be liquefied upon heating, separated by an edible or other insulating barrier or layer, as for instance a cake-like layer positioned between the ice cream and body of topping material, or by an edible or other container adapted to receive the syrup or topping material and embedded in the ice cream, the cake-like layer or container acting to keep the syrup or topping hot until consumed, or for at least ten or fifteen minutes.

To these and other ends, the invention consists in the method and construction that will appear clearly from the following description when read in conjunction with the accompanying drawings, the novel features being pointed out in the claims following the specification.

Figure 2:
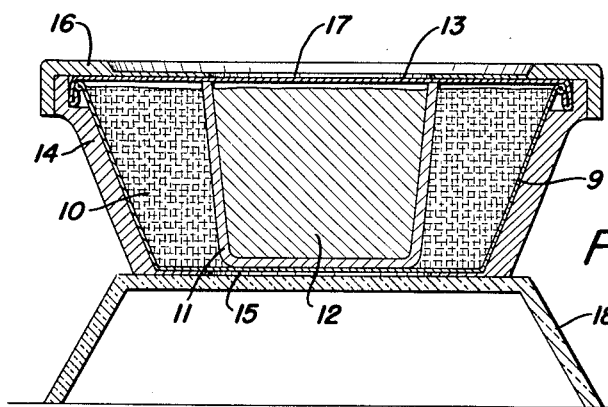

In the drawings:

Fig. 1 is a sectional view illustrating a frozen confection constructed in accordance with one embodiment of the invention in which an edible insulating barrier such as a cake-like layer is superposed on a body of ice cream or frozen dessert and a layer of topping material or syrup overlies the insulating cake layer, and showing the manner in which the electronic waves are controlled when the food package is heated, and Fig. 2 is a similar view of a modified construction of frozen confection in which an edible cup is embedded in the body of ice cream, with the topping material or syrup located within said cup, and showing the manner of controlling the electronic waves to effect liquefying of the topping or syrup body without softening the ice cream body.

The invention may be carried out in a variety of ways and is applicable to the heating of a package of ice cream in such a way as to effect quick and uniform softening throughout the body of ice cream, or to the heating of one portion of a multiple-food package to the partial or total exclusion of other foods in such package, as for instance in the differential heating of a sausage, meat, or cheese layer between two layers of bread or other edible material of a sandwich, or the differential heating of two food products in separate containers of a multiple-food package as for instance in packaging fried noodles and stew for chow mein where the noodles and stew must be heated to different degrees, or where ice cream or frozen dessert is packaged with a topping or syrup for making an ice cream sundae and the topping or syrup is separated from the ice cream by an insulating cake-like layer or by an edible barrier or receptacle to permit differential heating and prevent quick softening of the ice cream upon heating and quick cooling of the syrup after liquefaction, and in all of these applications, the differential heating effect is obtained by dielectrically heating the food package with high frequency alternating currents such as produced by electronic generators of the vacuum tube type, as for instance by placing the food package in a conventional "Radar" range employed for quick cooking of foods, and positioning a shield of metal or other suitable electrically conducting material in relation to the food package so as to permit access of the electronic waves to one portion of the food package to a greater extent than to other parts thereof.

Referring to Fig. 1, which shows one form of food package consisting of a frozen confection adapted to be heated in accordance with the invention, 1 designates a cardboard or paper container provided with the usual cover 2, and within the container 1 is a body of ice cream 3 or similar frozen dessert, which is surmounted by a barrier or layer 4 of suitable insulating edible substance such as a cake-like body, while superposed on the cake-like barrier 4 is a layer 5 of syrup or topping material, which may be chocolate or of any other desired flavor.

The frozen confection is prepared by first placing the body of ice cream 3 while in a comparatively soft state within the container 1, then placing a previously baked cake or body of cake-like material 4 over the body of ice cream, the cake entirely covering the ice cream body and fitting snugly within the container 1, and finally the topping material or syrup 5, preferably in a semi-plastic state, is placed over the cake body 4. The cover 2 is then positioned over the container 1 and the latter placed in a freezing compartment until ready to be served.

The purpose of such a construction is to enable serving an ice cream sundae consisting of ice cream with chocolate or other syrup or topping thereover without the necessity of having to pour the syrup onto the ice cream at the time of serving, thus enabling preparing a stock of frozen confection packages in advance, any one of which can be selected for flavor and readied for service quickly by subjecting the package to electronic or high frequency alternating current, thus dielectrically heating the package while shielding it by an electrically conducting element in such a way as to prevent undue softening of the ice cream body while heating the topping or syrup material until it preferably is in a hot liquid state.

To accomplish this, the frozen confection package is placed within a cup 6 constructed of any suitable metal or other electrically conductive material, the metal cup 6 being shaped to fit around and conform to the exterior of the cardboard container 1 and to extend upwardly around the exterior of the latter to a point coinciding with the top of the ice cream body 3.

The metal cup 6 with the frozen confection package placed therein, as shown in Fig. 1, is then positioned on a suitable support 7 of glass, porcelain, or other electrically insulating material located within an electronic or high frequency heating chamber indicated at 8, such for instance as a conventional "Radar" range, which depends for its operation on the use of high frequency alternating current generated by vacuum tubes. It will be understood that the process can be used in conjunction with any high frequency heating apparatus, such as variously known as electronic heating, radio wave heating, diathermic heating, or dielectric heating, where heat is created by electronic generators of the vacuum tube type, and it is deemed unnecessary for the purposes of the invention to disclose the construction of such heating means.

Such heat quickly penetrates a non-conducting substance and does not readily penetrate but rather is crowded onto the surface of a metal or other conductor, and it has been found that by placing a conducting shield in proximity to a frozen food package such as described above, in such position as to prevent access of the high frequency waves to the body of ice cream, the latter is retained in a hard, frozen state while heat is transmitted quickly to the body of syrup or topping material, heating and liquefying the same in the course of a few seconds. The cake-like body or barrier 4 acts as a heat-insulating element between the hot liquid syrup 5 and the ice cream body so as to prevent softening of the ice cream by conduction and excessive cooling of the syrup after it is heated. The layer 4 also prevents the syrup from reaching the ice cream body too quickly, and to a substantial extent obviates conduction of heat from the hot syrup to the body of ice cream.

Upon removal of the metal cup 6 from the heating chamber, the confection package is removed from the cup 6, the cover 2 is removed from the container 1, and the chocolate sundae or other combination of ice cream and syrup is ready to serve. The dessert is eaten by dipping a spoon to the bottom of the container 1, thus securing a portion of the ice cream body 3, a portion of the cake 4, and a portion of the syrup body 5. The cake layer 4 serves to maintain the ice cream body in a satisfactory hardened state until it is all consumed, preventing excessive softening of the ice cream and also preventing the syrup from becoming quickly mixed with the ice cream, so that as the latter is consumed, each portion will contain more or less uniform proportions of ice cream, cake, and syrup.

Another form of frozen food confection with which the invention may be carried out is illustrated in Fig. 2 in which the paper or cardboard container 9 contains a body of ice cream or other frozen dessert 10, while embedded in the latter is a receptacle 11 of any suitable edible material such as conventional ice cream cone containers, or other suitable dough which is sufficiently hard and impervious to liquid to receive a body 12 of a syrup or topping material, and maintain the latter out of contact with the body of ice cream 10.

Such a package is prepared by first filling the cardboard container 9 with ice cream or other frozen dessert in a softened state, then inserting the edible receptable 11, forcing it downwardly centrally of the ice cream body until it occupies a position approximately as shown in Fig. 2, then filling the receptacle 11 with chocolate syrup or other syrup or topping material 12. The cover 13 is then placed on the container 9 and the confection package placed in a freezing compartment where it is maintained in a hard frozen state until ready to be served.

When serving, it is desirable to heat and soften or liquefy the syrup or topping material 12 within the receptacle 11 without unduly softening the body of ice cream, and this is accomplished by placing an electrically conductive shield in such position in relation to the ice cream as to prevent access thereto of the high frequency heat. This is accomplished by placing the frozen confection package within a cup 14 of metal or other electrically conducting material, having a central opening 15 in its bottom, and placing over the cup 14 a cover 16 of metal or other electrically conducting material having a central opening 17 arranged oppositely above the opening 15 in the bottom of the cup.

The metal cup, with the frozen confection package therein and metal cover 16 disposed thereover, is then arranged on a suitable support 18 of glass, porcelain, or other electrically insulating material within an electronic heating chamber such as previously described, and subjected to high frequency alternating current, or electronic or dielectric heat. The heat thus generated enters through the openings 15 and 17 and penetrates the body of syrup or topping material 12, causing the latter to become quickly liquefied and heated, while at the same time the metal cup 14 and cover 16 act as shields that prevent access of the electronic heat to the body of ice cream or other frozen dessert 10 and thus maintain the same in a satisfactorily hard frozen state until ready to serve.

After subjecting the frozen food package to action of the electronic heat for several seconds, the metal cup 14 is removed from the electronic heating chamber, the cover 15 removed from the cup 14, and the confection package taken from the cup 14. The cover 13 is removed and the dessert is ready to be served. Preferably with the syrup 12 within the receptacle 11 in a hot liquid state, the dessert is consumed by first dipping into the ice cream and then into the syrup, taking a portion of ice cream and syrup with each spoonful, and when the ice cream and syrup are entirely consumed, the edible receptacle 11 with the syrup remaining therein can be eaten, or the receptacle 11 can be consumed along with the ice cream and syrup at the same time.

The method herein disclosed may also be employed for the purpose of quickly softening a package of ice cream which has been frozen to a very hard state. Under conventional freezing practices, it is frequently necessary to subject a package of ice cream to atmospheric temperature for a considerable period of time before it is in a softened state suitable for eating, and with the present invention, such a hard frozen ice cream package can be softened to a uniform degree throughout in a few seconds.

It is essential in such an ice cream softening operation that the heat be applied uniformly throughout the body of ice cream so that the center will be softened to the same extent and as fast as the ice cream at the periphery or outer portion, and this is accomplished by placing the ice cream package in an electronic heating chamber, within a metal or conducting shield such for example as illustrated in Fig. 2, which limits access of the electronic waves to the ice cream at the outside of the body or around its periphery while permitting greater access of the electronic waves through the openings at the top and bottom of the conducting shield and to the center of the ice cream mass, and in this manner a body of ice cream can be quickly softened uniformly throughout.

The invention may also be applied to the heating of other food packages containing a multiplicity of different food products, either in contact with each other or in separate containers, where it is desirable to heat one food product of the package to a greater extent than another, as for instance in a food package comprising sausage or meat interposed between bread, roll, or other sandwich elements where it is essential to heat or cook the sausage or meat to a greater extent that the bread, or in the case of a chow mein package comprising fried noodles and stew in separate containers, one of which must be heated to a greater extent than the other, and any such package can be processed according to the invention by placing it within an electronic heating chamber, or subjecting it to the heat of high frequency alternating current while shielding the package in such a way as to permit access of the high frequency waves or electronic heat to one part of the package to a greater extent than to other parts thereof.

While the invention has been described with reference to certain structural embodiments of food packages and conducting shields for permitting heating of a package to attain the desired objective, the invention is not limited to the specific details herein shown, and this application is intended to cover such modified constructions or procedure as may come within the intent of the improvement and the scope of the following claims.

I claim:

1. The method which consists in dielectrically heating a food package by means of high frequency alternating current and controlling the heating effect by an electrically conductive shield positioned in proximity to a portion of the food package and acting to prevent access of the high frequency waves to portions of the package and to cause the high frequency waves to reach and heat some portions of the package to a greater degree than other portions thereof.

2. The method which consists in dielectrically heating a package of ice cream by means of high frequency alternating current and effecting uniform softening of the ice cream throughout its entire mass by means of an electrically conducting shield positioned in proximity to portions of the package and in the path of the high frequency waves.

3. The method which consists in dielectrically heating a package containing a multiplicity of food products in juxtarelation to one another by means of high frequency alternating current while placing in proximity to one of said food products an electrically conducting shield and thereby preventing access of the high frequency waves to portions of the package and heating the different food products to different degrees while located in the same electronic field.

4. The method which consists in dielectrically heating a food package containing different food products with a barrier therebetween by means of high frequency alternating current while positioning in proximity to one of said food products an electrically conducting shield and thereby preventing access of the high frequency waves to portions of the package and heating the different food products to different degrees.

FRANK WESLEY MOFFETT, Jr.

REFERENCES CITED

The following references are of record in the file of this patent:

UNITED STATES PATENTS

| Number | Name | Date |
|---|---|---|
| 1,511,878 | Gargay | Oct. 14, 1924 |
| 2,004,863 | Gibson | June 11, 1935 |
| 2,135,808 | Friedman | Nov. 8, 1938 |
| 2,413,003 | Sherman | Dec. 24, 1946 |
| 2,486,194 | Moser | Oct. 25, 1949 |
| 2,495,435 | Welch | Jan. 24, 1950 |
| 2,511,082 | Rubin | June 13, 1950 |